(12) United States Patent
Steelberg et al.

(10) Patent No.: US 8,495,089 B2
(45) Date of Patent: Jul. 23, 2013

(54) SYSTEM AND METHOD FOR OPTIMIZING MEDIA PLAY TRANSACTIONS

(75) Inventors: Ryan Steelberg, Newport Beach, CA (US); Chad Steelberg, Newport Beach, CA (US)

(73) Assignee: Google Inc., Mountain View, CA (US)

(*) Notice: Subject to any disclaimer, the term of this patent is extended or adjusted under 35 U.S.C. 154(b) by 1038 days.

(21) Appl. No.: 11/141,537

(22) Filed: May 31, 2005

(65) Prior Publication Data

US 2005/0278736 A1 Dec. 15, 2005

Related U.S. Application Data

(60) Provisional application No. 60/662,951, filed on Mar. 17, 2005.

(51) Int. Cl.
*G06F 17/30* (2006.01)

(52) U.S. Cl.
USPC .......................................... 707/770; 707/913

(58) Field of Classification Search
USPC ............ 707/1–10, 100–102, 104.1, 200–201, 707/913, 770; 705/14, 40; 725/1, 22, 2
See application file for complete search history.

(56) References Cited

U.S. PATENT DOCUMENTS

| | | | | |
|---|---|---|---|---|
| 5,715,018 A * | 2/1998 | Fasciano et al. | ............... | 348/722 |
| 6,282,548 B1 * | 8/2001 | Burner et al. | ............... | 707/104.1 |
| 6,286,005 B1 * | 9/2001 | Cannon | ........................ | 707/100 |
| 6,308,327 B1 * | 10/2001 | Liu et al. | ........................ | 725/37 |
| 6,338,043 B1 * | 1/2002 | Miller | ............... | 705/14 |
| 6,374,177 B1 * | 4/2002 | Lee et al. | ....................... | 701/200 |
| 6,388,712 B1 * | 5/2002 | Shinohara et al. | ............. | 348/473 |
| 6,502,076 B1 * | 12/2002 | Smith | ............... | 705/14 |
| 6,606,745 B2 * | 8/2003 | Maggio | ........................... | 725/23 |
| 6,711,474 B1 * | 3/2004 | Treyz et al. | ....................... | 701/1 |
| 6,724,403 B1 * | 4/2004 | Santoro et al. | ................ | 715/765 |
| 6,735,435 B2 * | 5/2004 | Newell et al. | ................. | 455/419 |
| 6,820,055 B2 * | 11/2004 | Saindon et al. | ................ | 704/235 |
| 6,820,277 B1 * | 11/2004 | Eldering et al. | ................ | 725/35 |
| 6,915,107 B1 * | 7/2005 | Lusk | ............................ | 455/3.06 |
| 6,941,324 B2 * | 9/2005 | Plastina et al. | ............. | 707/104.1 |
| 6,952,559 B2 * | 10/2005 | Bates et al. | .................. | 455/3.06 |
| 6,961,549 B2 * | 11/2005 | Mori | ........................... | 455/179.1 |
| 7,039,930 B1 * | 5/2006 | Goodman et al. | .............. | 725/22 |

(Continued)

FOREIGN PATENT DOCUMENTS

WO WO01/57757 11/2004

OTHER PUBLICATIONS

PCT International Search Report and Written Opinion, PCT/US06/19096, Apr. 30, 2007, 7 pages.

(Continued)

*Primary Examiner* — Miranda Le
(74) *Attorney, Agent, or Firm* — Fish & Richardson P.C.

(57) ABSTRACT

A database interface for developing at least one media play is disclosed. The database interface for developing at least one media play includes a plurality of templates, generated in accordance with feedback prior ones of the at least one media plays, at least two desired criteria limiting circumstances for play of the media play received at one of said templates, and an accessor that accesses media play inventory and preempts certain of the media play inventory with an insertion of the media play according to said at least two desired criteria.

14 Claims, 10 Drawing Sheets

U.S. PATENT DOCUMENTS

| | | | |
|---|---|---|---|
| 7,055,166 B1 * | 5/2006 | Logan et al. | 725/32 |
| 7,069,582 B2 * | 6/2006 | Philyaw et al. | 726/3 |
| 7,085,732 B2 * | 8/2006 | Gould | 705/14 |
| 2001/0051559 A1 * | 12/2001 | Cohen et al. | 482/8 |
| 2002/0023020 A1 * | 2/2002 | Kenyon et al. | 705/26 |
| 2002/0059646 A1 * | 5/2002 | Kim | 725/139 |
| 2002/0099600 A1 | 7/2002 | Merriman et al. | |
| 2002/0178058 A1 * | 11/2002 | Ritchie et al. | 705/14 |
| 2002/0194598 A1 | 12/2002 | Connelly | |
| 2003/0023489 A1 | 1/2003 | McGuire | |
| 2004/0103026 A1 * | 5/2004 | White | 705/14 |
| 2004/0133467 A1 * | 7/2004 | Siler | 705/14 |
| 2004/0133909 A1 * | 7/2004 | Ma | 725/34 |
| 2004/0215515 A1 * | 10/2004 | Perry | 705/14 |
| 2005/0021396 A1 * | 1/2005 | Pearch et al. | 705/14 |
| 2005/0039206 A1 | 2/2005 | Opdycke | |
| 2005/0065806 A1 * | 3/2005 | Harik | 705/1 |
| 2005/0065844 A1 * | 3/2005 | Raj et al. | 705/14 |
| 2005/0137958 A1 * | 6/2005 | Huber et al. | 705/37 |

OTHER PUBLICATIONS

PCT International Search Report and Written Opinion, PCT/US05/16405, Sep. 25, 2007, 8 Pages.

PCT International Search Report and Written Opinion, PCT/US06/18405, Aug. 29, 2007, 8 Pages.

PCT International Search Report and Written Opinion, PCT/US06/09401, Sep. 22, 2006.

* cited by examiner

SYSTEM AND METHOD FOR OPTIMIZING MEDIA PLAY TRANSACTIONS

CROSS-REFERENCE TO RELATED APPLICATIONS

This application claims priority under 35 U.S.C. §119(e) to U.S. Provisional Application No. 60/662,951, filed Mar. 17, 2005, entitled "Broadcast Monitoring System and Method," is related to U.S. patent application Ser. No. 11/131,022, filed May 16, 2005, entitled "Broadcast Monitoring System and Method for Intelligent Optimization," and is related to U.S. patent application Ser. No. 11/129,141, filed May 13, 2005, entitled "System and Method for Utilizing Dual feedback Loops," which applications are hereby incorporated by reference herein as if set forth in their entirety.

FIELD OF THE INVENTION

The present invention relates to broadcasting, and more particularly to the use of a database interface for developing at least one media play.

BACKGROUND OF THE INVENTION

Many broadcasters and advertisers struggle with managing broadcast and advertising campaigns, and try to identify which broadcasting and advertising is effective and, perhaps more importantly, which is not. For example, advertisers may spend thousand of dollars and dedicate countless hours producing advertising campaigns, and subsequently monitoring and managing those campaigns, in an attempt to capture the attention of and maximize the response from a selected or targeted audience. Advertisers try to target advertising to particular groups of consumers by tailoring the advertising campaign media, the frequency of the campaign, the nature of the advertisements, and many other variables. Advertisers may place advertisements in newspapers, magazines, trade journals, direct mailings, yellow pages, radio, and television. Unfortunately, advertisers do not presently have an accurate and timely mechanism for monitoring and tracking the delivery or broadcast of their campaigns, let alone the response to their campaigns. This problem may be exacerbated in broadcast radio, where advertisers may not receive verification of delivery or broadcast of advertising campaigns for up to weeks after the scheduled run of campaigns. An automated system that is capable of providing the advertiser with real-time, tailored and accurate reports on which radio advertising campaigns and programs are and were delivered, and on which station, and when, has thus far eluded those skilled in the art.

Attempts to identify and track where and when select radio advertising campaigns and radio broadcast programming are broadcast over the air have, to date, included using computer automated or manual listening posts deployed in geographic markets to record, log and analyze radio broadcasts over the air to identify songs, advertisements, and selected programming. Advertisers may contract with broadcast monitoring firms to receive reports on what advertising and radio programming was broadcast. Such a mechanism is error-prone, inefficient, and untimely. Marketers and advertisers, who often focus on increasing sales and driving product and service demand, do not have the time to wait for reports to be generated, particularly when, even after waiting for a report, the report may include discrepancies and errors.

Advertisers may be conducting costly advertising campaigns on a very tight schedule, and may need to act on a failed delivery or broadcast, either on a certain station or across a certain market, by finding alternative advertising opportunities. Such a method might come to be if the advertiser could verify immediately whether the campaign had been delivered. Monthly affidavits or reports are often inadequate to service the needs of advertisers. Reporting often does not capture crucial information to the advertiser, at least in that such reports generally fail to report the aggregate audience size, segmented by demographics and geography, at the time of advertising delivery. Such information is usually not available through any existing radio advertising and programming auditing or reporting services. However, such information may be valuable and crucial to an advertiser. An advertiser may prefer to identify the audience and those potential consumers who listened to the advertising, and directly compare those metrics against response and sales numbers.

An effective mechanism for an advertiser to monitor and track radio advertising delivery has, to date, eluded those skilled in the art. Accordingly, a need exists for a system and method for providing the broadcaster/advertiser with real-time, tailored and accurate reports on which broadcast and advertising campaigns and programs were delivered, including station information, such that the broadcaster/advertiser may identify the audience and those potential consumers who listened to the broadcast or advertising, and may directly compare those metrics against response and sales numbers.

Additionally, radio stations often operate with daily unsold advertising inventory, such as public service advertisements, bonus advertisements, unsold and/or remnant advertisements and preemptible advertisements, for example, resulting from market demand factors, poor ratings, station inefficiencies, trafficking logistics, programming logistics, and $3^{rd}$ party variables. This daily unsold advertising inventory may account, on average, for up to 30% of the advertising on a daily basis.

Specifically, a local station may load advertising orders into the traffic system and when these advertisements are scheduled against the schedule log gaps and holes may result. This may be caused by not having an advertisement to schedule during a certain time slot. Generally systems fill these gaps with public service advertisements, bonus advertisements and/or low-priority advertisements in order to fill in the schedule.

An effective mechanism to monitor and monetize unsold inventory has, to date, eluded those skilled in the art. Accordingly, a need exists for a system and method for monetizing unsold inventory using the schedule file and replace unsold inventory with paid advertising.

BRIEF SUMMARY OF THE INVENTION

The present invention is directed to a system for optimizing play of media content, said system comprising, a hub that is at least partially remote from a media content play point, for accessing and instructing a forwarding of the media content for play, at least one output associated with the hub that contributes non-play content, and at least one module at the media content play point for the parsing of the non-play content, wherein the parsed non-play content enables the hub to instruct a preemption of a first of the media play content with an accessing and insertion of a second of the media play content to the media content play point.

The present invention also includes a database interface for developing at least one media play, including a plurality of templates, generated in accordance with feedback prior ones of the at least one media plays, at least two desired criteria limiting circumstances for play of the media play received at one of said templates, and an accessor that accesses media play inventory and preempts certain of the media play inventory with an insertion of the media play according to said at least two desired criteria.

It is to be understood that the figures and descriptions of the present invention have been simplified to illustrate elements that are relevant for a clear understanding of the present invention, while eliminating, for the purposes of clarity, many other elements found in a typical inventory tracking system. Those of ordinary skill in the pertinent art will recognize that other elements are desirable and/or required in order to implement the present invention.

BRIEF DESCRIPTION OF THE FIGURES

Understanding of the present invention will be facilitated by consideration of the following detailed description of the present invention taken in conjunction with the accompanying drawings, in which like numerals refer to like parts, and wherein.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical communication system and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The present invention enables the monetizing of unsold inventory. Specifically, the present invention utilizes a schedule file to identify unsold inventory, unsold avails, and files these slots with paid advertisements.

The present invention provides a system and method for accurately and timely identifying where and when a radio advertisement or radio program is broadcast. The present invention may provide a communication environment configured to monitor, track, and report on radio verification of broadcast information related to a specific advertisement or program. This broadcast information may be transmitted via a network-accessible server and formatted for retrieval over a network. The present invention may be designed to permit a reporting-service subscriber to connect, such as via a network, to a server and request a report, which may be based on the verification of broadcast information, for a selected advertising campaign or radio program.

Figure 1:
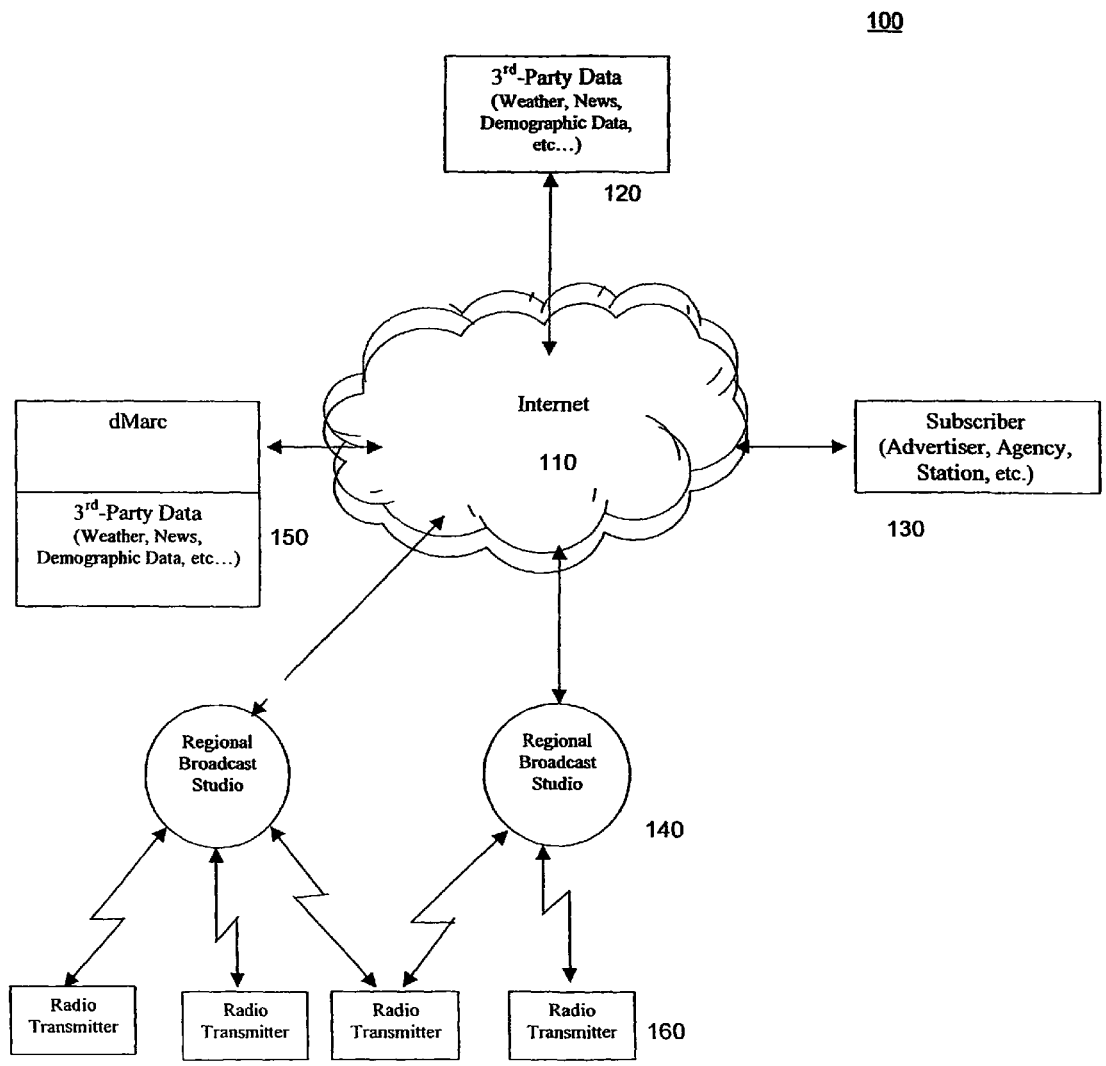
FIG. 1 illustrates an architecture of a communication system 100 according to an aspect of the present invention.

Referring now to FIG. 1, there is shown an architecture of a communication system 100 according to an aspect of the present invention. System 100 may include a networked environment 110 communicatively coupling party data 120, subscriber 130, at least one regional broadcast studio 140, and a broadcasting hub 150. At least one regional studio 140 may be further communicatively coupled to at least one radio transmitter 160.

Communication system 100 may include a broadcasting hub 150 configured to store and forward verification of broadcast information of radio advertising and radio programming from at least one regional broadcast studio 140. This verified information may be forwarded to a data recorder for recordation of a sample of the information. Further, the recorded verified information may be parsed into campaign information and remainder of the broadcast information, wherein the campaign information may include radio advertising or radio programming information associated with a broadcast event. The data recorder may make accessible the verified information to networked environment 110 such that a myriad of verified information may be accumulated as necessary. Networked environment may forward the verified information to a subscriber 130 and/or broadcasting hub 150 responsive to a request for the verified information.

According to an aspect of the present invention, the identification of when a radio advertisement or radio program was broadcast may be achieved. This identification may be performed within the broadcasting hub 150. Within hub 150 a data collector may identify verification of broadcast information related to an audio file associated with an advertising campaign or radio program, and may forward that information to networked environment 110. Hub 150 may include software for tabulating and formatting the information into a serviceable report, such as in response to a request by subscriber 130. The information in, for example, such a report, may be presented based on many different criteria, such as, for example, the total number of advertising or programming broadcasts per campaign, a listing of which stations the radio advertisement or program was broadcast over, an hourly breakdown of the broadcasts, the demographics of the broadcast audience, the geography of the broadcast audience, and/or the format of the radio stations, for example.

According to an aspect of the present invention, the reports available to subscriber 130 may reflect the latest information available. The verification of broadcast information may be forwarded from the data collector to networked environment 110, such as when the verification of broadcast information becomes available from broadcast hub 150. Such a substantially real-time report may provide subscriber 130 with substantially real-time data regarding the delivery of radio advertisements and radio programs.

According to an aspect of the present invention, the verification of broadcast information associated with advertising campaigns or programs may be combined with other information, and may be stored in additional databases either resident on or accessible by networked environment 110, to produce reports of demographic information about the audience of the advertising campaign or program. Such other information for combination with the verification information may be obtained, for example, from relevant internet or intranet sites, either automatically in response to an instruction included with the submission of the program to be broadcast, or manually upon receipt of a subscriber request.

Figure 2:
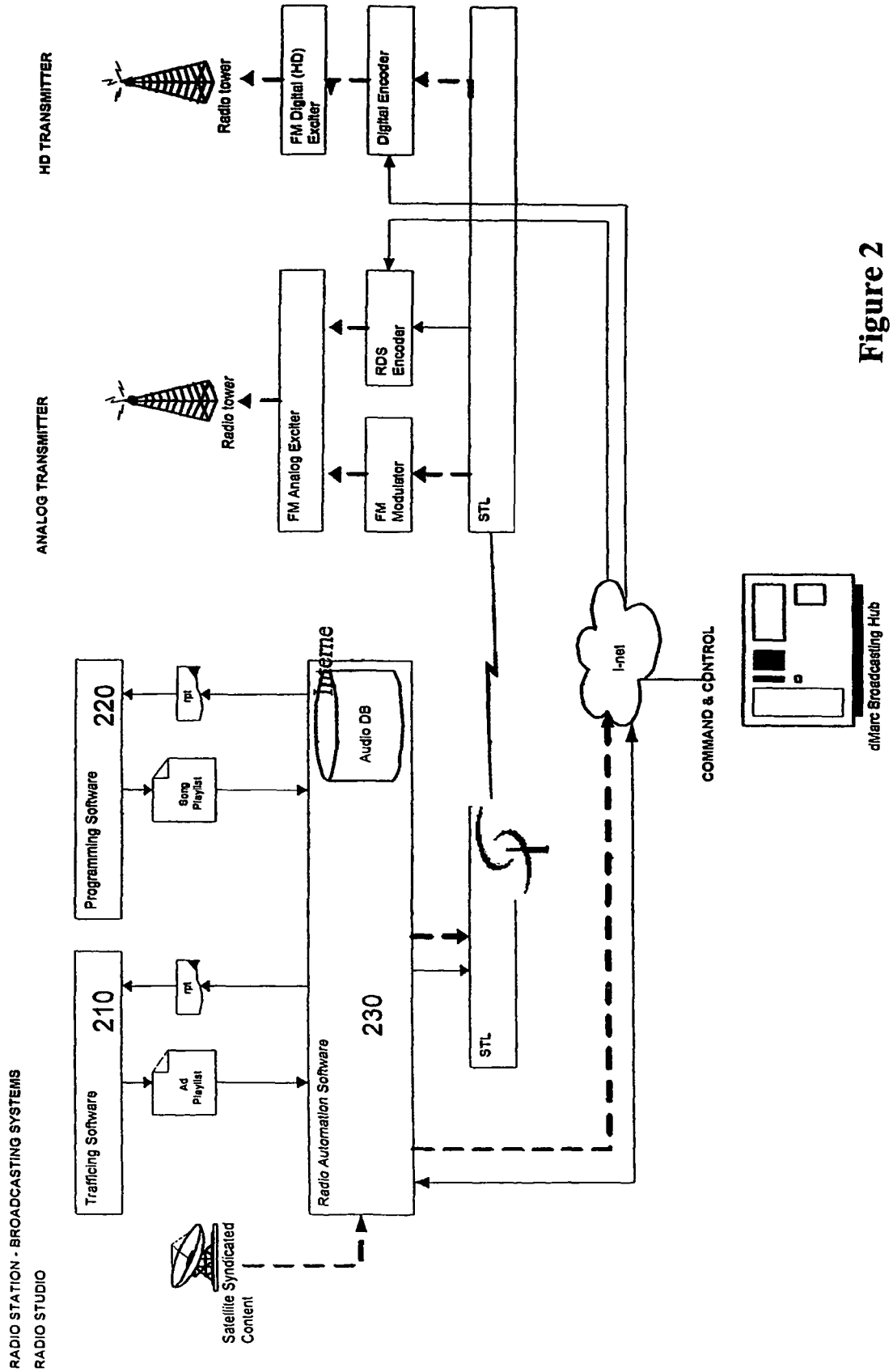
FIG. 2 further illustrates the system of FIG. 1.

In order to more fully describe the interconnectivity, an exemplary embodiment is set forth herein below. Referring now also to FIG. 2, there is shown a system according to an aspect of the present invention. Subscriber 130 may conduct one or more broadcast or advertising campaigns by purchasing radio advertisements across several local and regional radio stations. Subscriber 130 may distribute audio commercials to the radio stations for scheduling by a regional broadcast studio 140. Subscriber 130 may verify the delivery and track the broadcast of each of the one or more advertising campaigns and associated audio commercials. It may be beneficial for subscriber 130 to engineer the one or more advertising campaigns with a unique and corresponding file name. In this regard, each audio commercial digital file may have a subscriber 130—associated, unique file name. The audio commercial digital files associated with the advertising campaigns are referred to in this discussion as "campaign creatives."

Regional broadcast studio 140 may broadcast a campaign creative for subscriber 130. Regional broadcast studio 140 may initiate a broadcast of the campaign creative by scheduling broadcast delivery within its trafficking system 210 or programming system 220. The campaign creative may be loaded onto radio automation software 230 of station 140. Radio automation software 230 may include the scheduling and/or "flight" information as provided by trafficking system 210 and programming system 220. Broadcast hub 150 may forward scheduling information regarding the campaign creative, captured from radio automation software 230, to data collector. At the scheduled time, radio automation software 230 may stream the campaign creative to a station transmitter 160 for subsequent broadcast over the air. Broadcast hub 150 may forward verification of broadcast information regarding the campaign creative, captured from radio automation software 230, to data collector. The data collector may accumulate and/or store the information passed from broadcast hub 150.

According to an aspect of the present invention, data collector may isolate the verification of broadcast information related to campaign identifiers, for example, by including a table identifying the campaign identifiers. When verification of broadcast information arrives regarding one of the campaign identifiers in the campaign identifier table, the data collector may forward that verification of broadcast information ("campaign information") to hub 150. The data collector may forward the campaign information as it arrives, or on a timed basis, such as in fifteen minute increments, one-hour increments, several-hour increments, or other increment known to those skilled in the pertinent arts. The rate at which the campaign information is passed from the data collector to hub 150 may limit how current, or real-time, a report may be. In this regard, the data collector according to an aspect of the present invention may be configured to provide the campaign information to hub 150 in real-time, such as not later than a few hours after the campaign information becomes available at the data collector. A portion of hub 150 may include a web server that receives the verification of broadcast information associated with each campaign identifier (the campaign information) from the data collector and stores that information on a permanent storage medium, such as a hard disk drive. The web server may tabulate the campaign information based on each campaign identifier. The table containing the campaign information may be as current as the rate at which the data collector provides the campaign information to the web server. Consequently, hub 150 via the web server may be able to generate reports of the broadcast of radio advertisements and radio programming in substantially real-time.

Hub 150 may provide access to the tabulated data over internet 110. Although internet 110 may be described as a wide area network for making the reports available to subscribers, those skilled in the art will appreciate that the system and method of the present invention encompasses any wide area network that allows access by subscribers to data stored on hub 150. Subscriber 130 may access hub 150 via a connection to internet 110. The connection to internet 110 may be any conventional connection that allows access to hub 150. For example, subscriber 130 may access hub 150 using TCP/IP and a conventional dial-up connection over a modem, or a dedicated connection that provides constant access. Hub 150 may have a unique HyperText Transfer Protocol (HTTP) address, a unique FTP address, or any other addressing scheme that allows subscriber 130 to identify hub 150.

Hub 150 may include server software, such as within a web server, that may allow subscriber 130 to request a report of a particular radio advertisement broadcast or radio program broadcast at any time. For example, subscriber 130 may connect to internet 110 in the middle of the day on a Tuesday. At that time, subscriber 130 may log on to hub 150 using a secure access protocol and issue a request to the web server to provide a report. The issued request identifies the particular radio advertisement or radio program of interest by campaign identifier. Hub 150 may respond to the request by reading the data stored in the table of campaign information associated with the campaign identifier provided by subscriber 130. Software resident on the web server may tabulate the report in accordance with the request. Finally, the web server publishes, such as in HTML or XML format, for example, the report to subscriber 130. In this manner, subscriber 130 may access and query the web server as frequently as desired to determine the broadcast of a particular advertising campaign or radio program.

Hub 150 and the web server may be configured to transmit reports to subscriber 130 at predetermined intervals, such as immediately, hourly, daily, weekly, or other time frame. For instance, software may be configured to simulate a subscriber request and cause the web server to generate and transmit the report to subscriber 130. Alternative means of delivery may also be employed, such as via electronic mail. These and other alternatives will become apparent to those skilled in the art upon a study of the disclosed embodiments.

Hub 150 and the web server may be configured to generate the report in response to a triggering event. Examples of such a triggering event may be a confirmation of broadcast for a select advertisement or program, or of a situation wherein an advertisement or program was scheduled to broadcast, but failed to deliver, or of an advertising campaign reaching a dollar cap value, for example. For instance, the web server may be configured to analyze the campaign information as it is received from the data collector. If the campaign information reflects that an advertisement with a specified campaign identifier was scheduled to broadcast at a certain time, but failed to broadcast, the web server may respond by issuing a flag to subscriber 130. According to an aspect of the present invention, the web server may be configured to extract from the campaign information the advertising client's telephone number, email, fax, or the like associated with the campaign identifier and transmit the broadcast information directly to subscriber 130 or someone associated with the subscriber, such as to follow up on the failed broadcast. The campaign information may be transmitted by digital or voice pager, by e-mail message, by human interaction, or by any other mechanism for alerting subscriber 130. In that manner, subscriber 130 may be substantially immediately notified that an advertisement failed to broadcast, and be provided with the radio station's contact information and advertising client information. Those skilled in the art will see the enormous benefits created by this aspect of the invention over existing technologies.

As may be evident to those possessing an ordinary skill in the pertinent arts, a myriad of reports may be created. By way of non-limiting example only, such reports may include campaign delivery by station, campaign delivery by market, campaign delivery by date, campaign delivery by hour, broadcast failure, and demographic reports. A campaign delivery by station report may identify upon which station a selected radio advertisement or radio program was broadcast. This report may enable subscriber 130 to verify delivery across a certain station, or within an associated geographic region. A campaign delivery by market report may identify the geographic market across which the campaign was broadcast. This report may enable subscriber 130 to verify delivery and coverage within a certain market. A campaign delivery by date report may provide subscriber 130 with per-day totals of broadcasts associated with a specified campaign. Subscriber 130 may use this type of report to easily identify those days with the heaviest advertising and programming response, such as for support planning purposes. A campaign delivery by hour report may provide subscriber 130 with per-hour totals of broadcasts associated with a specified campaign. Subscriber 130 may use this type of report to identify those day parts with the heaviest advertising and programming response for support planning purposes. A broadcast failure report may provide subscriber 130 with a listing of the campaigns that were scheduled but failed to broadcast. This information allows subscriber 130 to attempt to manage sales support, and take action to remedy failure. A demographic report may be provided. For example, the advertising campaign, broadcast across a specific market, may be mapped to area code or zip code to provide subscriber 130 with a broad overview of geographic locations of the receiving broadcast audience. Additional databases, such as those available from Census information, may be employed to generate financial, ethnic, and age-related demographic information which may be of use to subscriber 130.

Stations may desire and may be able to isolate themselves from the internet for a myriad of reasons. According to an aspect of the present invention and pursuant to what is currently deemed best practice for radio stations, stations may isolate mission critical on-air work stations from the public internet. Specifically, the present system may enable on-air workstations to connect securely to a data center over the internet without the on-air workstation being connected directly to the internet. Such a configuration may be achieved and optimized by using encryption and secure protocols, including, but not limited to outbound-only protocols.

In addition, networking models may be designed to minimize the impact on existing network configurations. For example, currently there are two prevalent equipments set: Scott Studios and Maestro found in the industry. Connection to each of these legacy systems without necessitating the redesign of either system may be beneficial.

Any networking model may be used such as a local proxy or local connection for example. Connecting using a local proxy need not require internet connectivity, and instead may require only connection to a local area network (LAN). One computer on the LAN may have two network cards, one of which communicates with the local proxy which in turn communicates with the data center via an encrypted outbound only connection. On the other hand a direct connection may require on-air workstations to have internet connectivity and may provide an outbound only connection to the data center.

Figure 3:
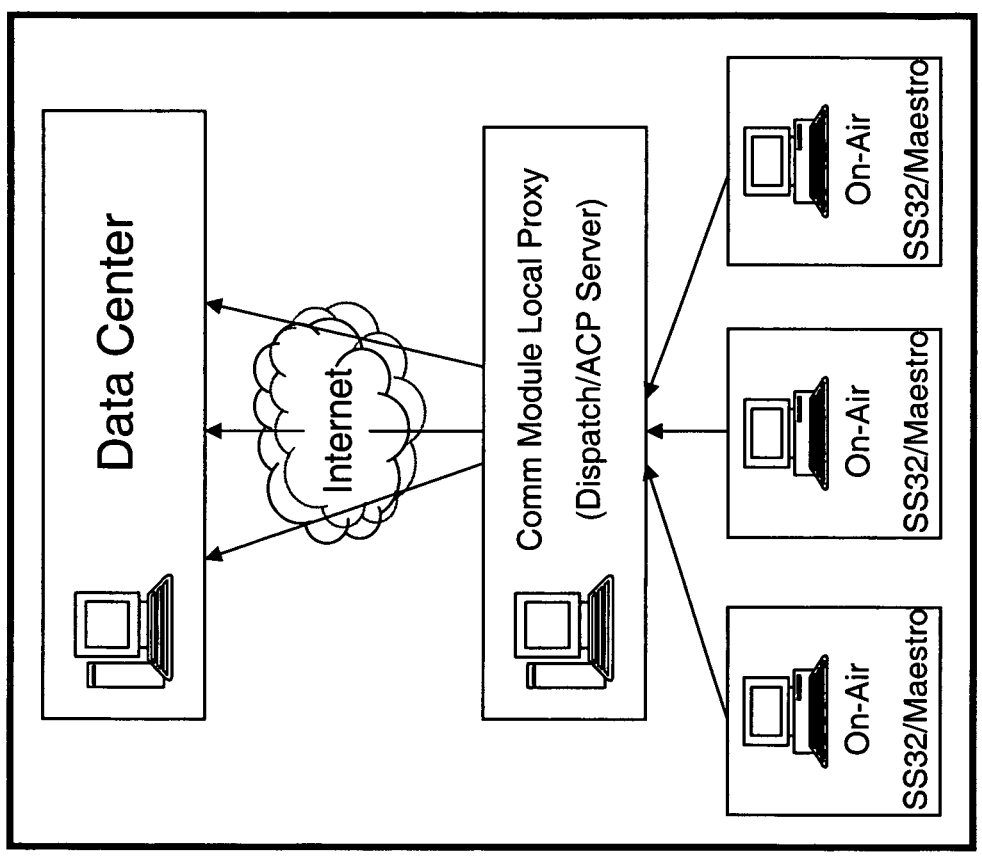
FIG. 3 illustrates a local proxy according to an aspect of the present invention.

As may be seen in FIG. 3, a local proxy may provide an encrypted connection to the data center and a reduction in the overall network traffic. Local proxy may use the Scott Studios and Maestro along with the local proxy to create an encrypted and secure connection to the data center. For this to happen, Scott Studios or Maestro may be present on each of the on-air automation workstations along with a local proxy module within the network. To establish the encrypted connection with the data center, the modules may rely on the station to have a dedicated internal automation system LAN and a separate corporate LAN with internet connectivity. There may also be one machine that is multi-homed, meaning it has two network cards and is aware of both networks. In most installations, the multi-homed machine is usually the dispatch or a server. This configuration has been and continues to be a hardware deployment by Scott Studios with both modules and hardware/network configuration in place, the Scott Studios and Maestro will automatically attempt to connect to the local proxy. Local proxy may, in turn, attempt to establish an encrypted connection with the data center. Local proxy may be designed to make use of the default network settings of the multi-homed machine for both the automation system LAN and the corporate LAN. Therefore, these network settings may remain largely unchanged. Additionally, the local proxy need not rely on Host name to connect to the data center but rather uses an IP address, therefore no DNS configuration should be necessary. Local proxy network settings may be modified if any of the default settings have been changed to block outbound internet traffic from the multi-homed machine over the corporate LAN or if inbound traffic from the automation system LAN has been blocked to the multi-homed computer. If these defaults have been modified, additional changes may be needed, such as: the multi-homed computer connecting outbound to the internet over the corporate LAN, such as on port 443 (HTTPS), for example; the multi-homed computer connecting outbound to the internet over the corporate LAN, such as on port 10,000, for example; the multi-homed computer connecting outbound to the internet over the corporate LAN, such as on port 80, for example; on-air workstations connecting outbound over the internal automation system LAN to the multi-homed computer, such as on port 10,000, for example; multi-homed computer accepting inbound traffic from the internal automation system LAN, such as on port 10,000, for example. Under such a configuration local proxy module may use specific ports to direct encrypted outbound-only traffic over the internet. For example, ports 443 (HTTPS) and 10,000 may be used for transmitting encrypted station information and module control traffic. Selection between these ports may be optimized to preserve system resources. Port 80 may be used for downloading unencrypted media files from the data center. After configuring a station's network, the on-air automation workstations may connect to the data center through the local proxy module automatically.

Figure 4:
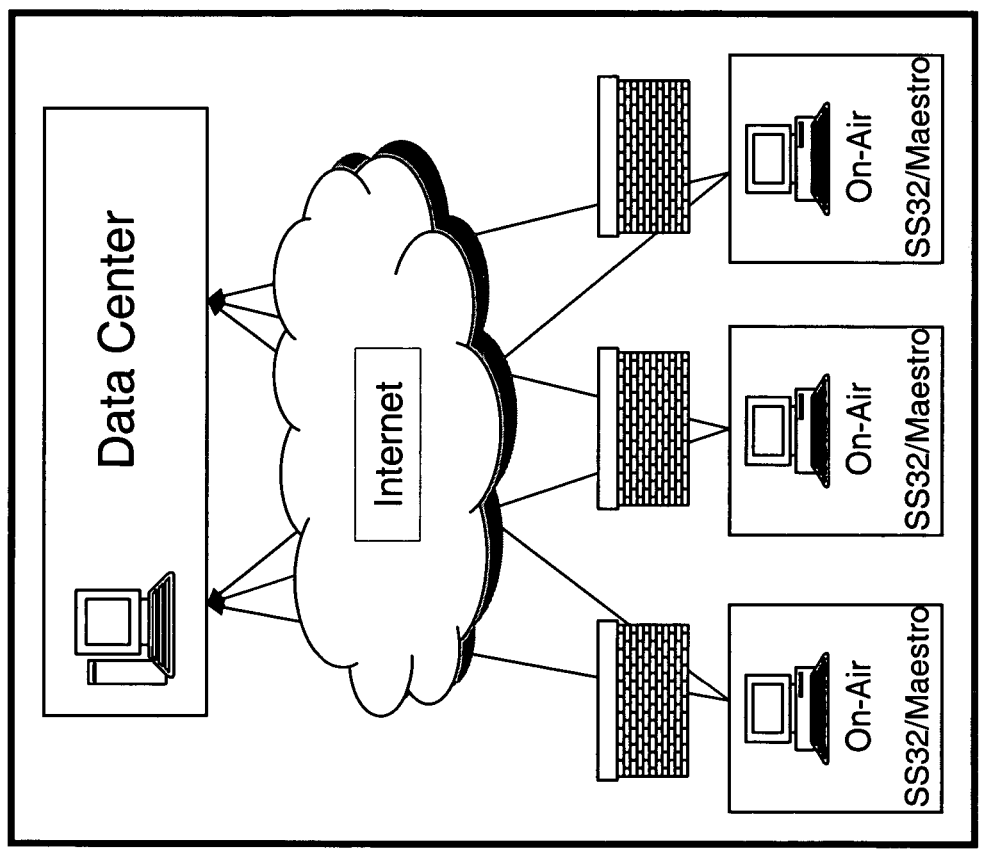
FIG. 4 illustrates a direct connection according to an aspect of the present invention.

As may be seen in FIG. 4, direct connection may be used for stations and station clusters that do not follow the automation system hardware deployment recommended for Scott Studios and Maestro equipment, stations that already have internet connectivity at each on-air workstation, or for stations that either cannot or chose not to deploy the local proxy model. Direct connection may use the Scott Studios and Maestro Modules on each on-air work station to create a secure connection to the data center. To establish the secure connection with the data center, each on-air automation workstation may have access to a network with a direct connection to the internet. With the proper communication modules installed and an internet connection present, the modules may automatically attempt to connect out to the data center. Direct connection may be designed to make use of the default network settings of the on-air workstations and instead of relying on host names to connect to the data center may use an IP address. As would be evident to those possessing an ordinary skill in the pertinent arts, using an IP address may prevent the need for a DNS configuration. On-air workstations may connect outbound to the internet over the corporate LAN, such as on port 10,000, for example. On-air workstations may connect outbound to the internet over the corporate LAN, such as on port 80, for example. Direct connection may use these specific ports to direct unencrypted outbound-only traffic over the internet. For example, HTTP traffic may be sent on port 80 and may be used for transmitting station information and for downloading media files from the data center. Port 10,000 may be used for transmitting communications information. Once the station's network has been configured, the on-air automation workstations may connect directly to the data center automatically.

Figure 5:
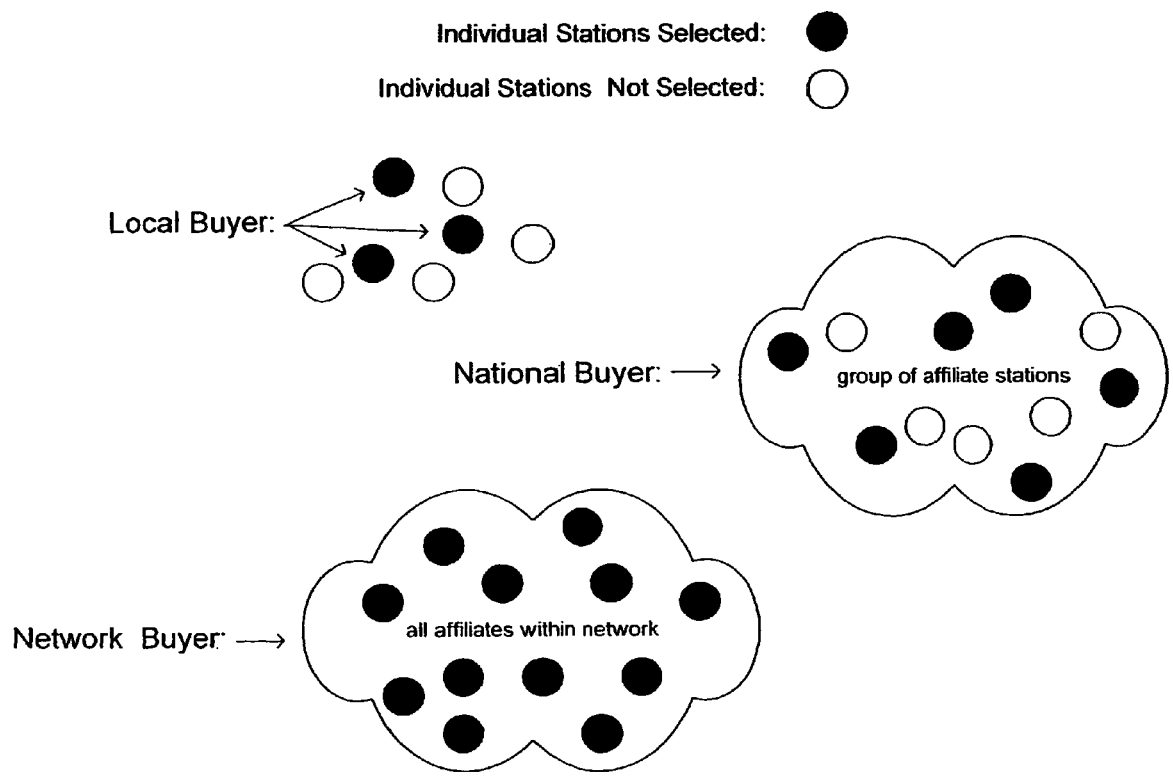
FIG. 5 is an illustration of an advertising buying environment in the present invention.

FIG. 5 is an illustration of an advertising buying environment in the present invention. FIG. 5 illustrates a local, a national, and a network advertising buyer. Of note, the local buyer buys individual ads on particular stations. The national buyer can pinpoint specific buys within a particular group of affiliate radio stations. The network buyer buys advertising for all affiliates within a network, such as in a radio syndication show environment. In the illustrated embodiment, an advertising buyer buys an insertion order, and the advertiser request correspondent to the purchase order goes into "traffic". Radio traffic is scheduled by trafficking software. For example, based on an advertiser request, traffic software may schedule the play of a particular ad in three slots at three assigned times each day during the weekdays of Monday through. Friday. Obviously, once advertising inventory builds, such as during rush hour or high desirability playtimes, conflicts arise between advertising requests.

To address these conflicts, the traffic software shuffles the requested advertising to maximize the revenue generated from particular ads at particular times (of course, advertising at premium times and on premium days brings premium revenue). The traffic software compiles a list of items to be played, wherein each item on the list is assigned a cut number that links the plays on the list together. In a typical embodiment, a text file consisting of the traffic log is manually reconciled at least once per day.

Figure 6:
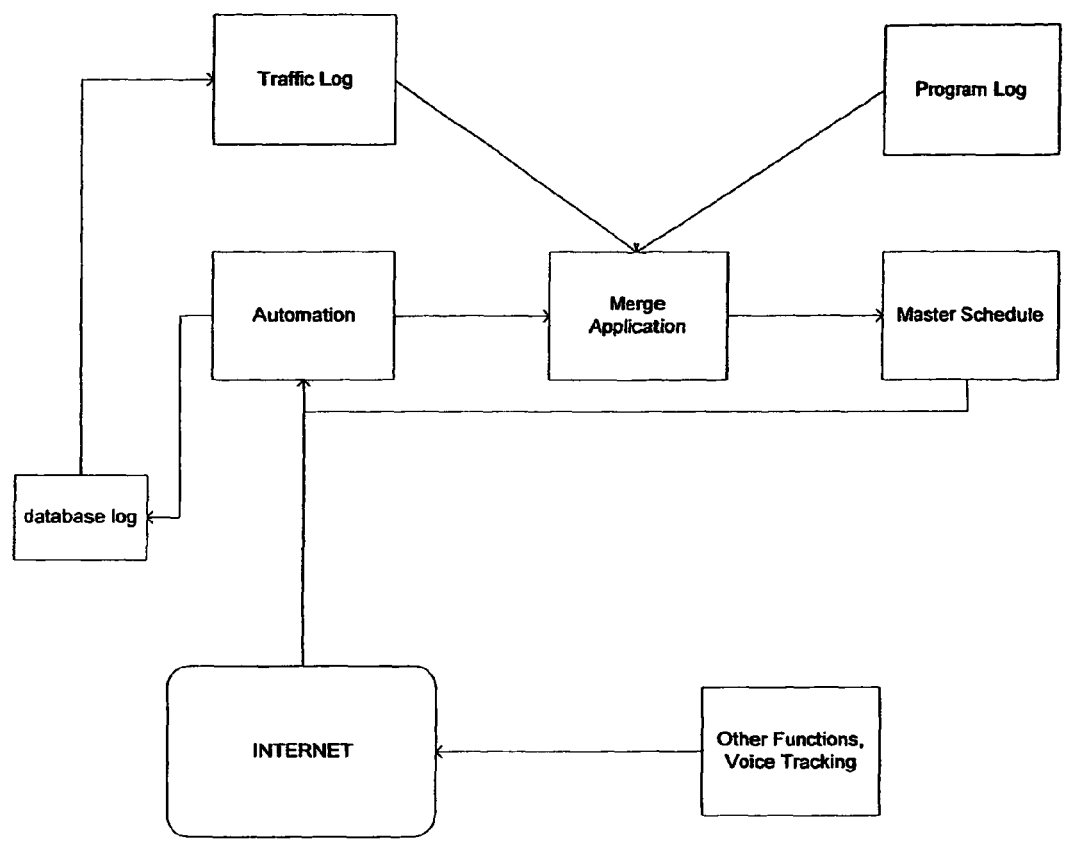
FIG. 6 is an illustration of a radio play environment.

FIG. 6 is an illustration of a radio play environment. The environment of FIG. 6 includes a traffic log such as that discussed above, a program log, a merge application, an automation for play, a master schedule, a tracking log, and may include remote applications, including external inputs such as voice tracking, satellite, and FTP, for example. The traffic log, the program log, and the master schedule as illustrated preferably include identifications of the plays that are to occur in accordance with each.

The traffic log is such as that handled by the traffic software as discussed hereinabove. The program log may include programs, such as songs, that are to be played over the air. The master schedule may include a validation of the media to be played, such as verification that the identification numbers included in the traffic log and program log are valid play items. In a typical embodiment, the merge application merges the traffic log, the program log, and the filling of any holes, such as by the automation, to create the master schedule. The master schedule is directed to the automation, and the automation monitors the inputs and outputs to and from the radio station for play over airwaves. The play log is generated based on the output of the automation as that output is generated over the airwaves. The output of the play log may be monitored before billing to advertisers to ensure that ads have properly been played by the automation.

In the embodiment discussed above, the automation controls the final output over the airwaves of a radio play. The automation may switch for example from a satellite channel to a local channel, or to an internet channel, and back again to obtain play from various locations for incorporation into the automation play. Such plays, as received by the automation, may include a metadata channel that does not include the radio plays, but rather includes information regarding the radio plays in the traffic log. For example, a metadata channel may infer that a remote radio feed is about to have a "hard break" or a "soft break". A soft break is one which is at the option of, for example, a radio personality, and a hard break is non-optional. As such, in an exemplary embodiment, a syndicated radio show may arrive for local play in the form of a compact disc, or may arrive by a satellite to the automation and may include a metadata channel including the information regarding the satellite play. Consequently, in an embodiment wherein the play originates from a remote point, the metadata channel may allow for a local station to insert particular items for an otherwise remotely generated play. In such an embodiment, the automation may switch back to the local play generation point for a limited set time, during which the local play point may generate local play items into the otherwise remotely generated play. Upon completion of the metadata instructed local play period, the automation may switch back to, for example, the satellite channel for a renewal of the remote play. As such, in the most frequent embodiments of present radio applications, all plays, from all locations, are controlled by the automation, and further, the automation provides validation, via the play log, that all plays have properly occurred.

In certain embodiments, the traffic log fed to the automation may include one or more "dummy" files. Such "dummy" file positions can include the place holders that allow for mapping of information, such as mapping of remote information over the internet and/or via FTP. Such a mapping may include the bundling of remote files and/or local files into a mapped position. Such mapped positions are not held as open, but rather are held as closed play positions in spite of the fact that it is unknown to the local automation precisely what plays will occur in the position of the "dummy" file.

Further, ads may be inserted via channel switching instructions fed over one or more metadata channels. For example, a plurality of regional ads, each dedicated to specific one or more regions of the country, may be simultaneously playing on a series of channels incoming to the automation, such as channels 4 through 8. A syndicated radio program may be playing simultaneously on, for example, channel 3 incoming to the automation. Upon the occurrence of a break, in accordance with the traffic log and metadata channels, on channel 3, the metadata channel may include instructions for each region to switch during the break to its correspondent incoming regionalized advertising channel. For example, a station playing the syndicated program on channel 3 in Philadelphia, Pa. may be instructed to switch, via the metadata channel, to channel 4 during a break in the program of channel 3 in order to play a regionalized ad on channel 4. Simultaneously, and during the same break on the program of channel 3, a station in Los Angeles, Calif. may be instructed, via the metadata, to switch to channel 8 in order to play regionalized advertising for that region then playing on channel 8. In such an embodiment, upon completion of a break on channel 3, all stations then participating in a syndicated play of channel 3 are instructed via the metadata to have the automation switch back to channel 3 for continuation of the syndicated play. Similarly, advertising may be cached on a particular channel to play in a particular order, and, when a break occurs on the channel then playing, a switch may be made to the cached advertising channel to allow for whatever numbers of cached ads to play that are capable of play during an allotted break window on the play channel. Upon closure of the break on the play channel, the automation may be instructed to switch from a cached advertising channel back to the play channel, and may pick up on the next switch to the advertising channel with the next keyed cached advertisement.

In an embodiment, metadata may be shipped on a particular channel, and programming may be shipped on a plurality of other channels. In such an embodiment, the metadata channel may be keyed to the play occurring on another channel and the metadata itself may call for insertion of data on the metadata channel or another channel onto the current play channel when a break, such as a soft break, occurs according to the metadata channel. Upon the occurrence of such a break in accordance with the metadata channel, a local feed may, for example, insert local advertising onto the current play channel, such as via switching to a local channel for the duration of the break according to the metadata channel.

Switching of the automation in accordance with the switching policies described hereinabove, allows for a preemption of a radio play. In existing play embodiments, if a break is called for at a particular time, such as at noon on a Friday, the channel on which the break is to occur must be continuously monitored, and the metadata of the channel on which the break is to occur must be continuously monitored, to ensure that the break occurs at the prescribed time. In embodiments described herein, a monitoring of, for example, channels such as the metadata channel may occur in real time, and as such assigned time plays, particularly of advertising or information spots, are no longer necessary. In particular, a monitoring of the metadata channel, even during a play incoming remotely on a separate channel, provides sufficient information to switch to an advertising or alternative play channel in accordance with the incoming metadata. Thus, in prior embodiments, the knowledge of the occurrence of a break must be pre-existent, and any movement of that break must be monitored. However, in embodiments discussed herein, no pre-existent knowledge of breaks is necessary. Rather, in embodiments discussed herein, the system of the present invention learns and gains knowledge of when preemption is to occur, and elects the proper preemption in real time based on the break then occurring as it occurs during the play. As such, the prior art merely inserts at a defined time, while the present invention preempts in real time based on a learning from the programming as it is playing.

In order to allow for a proper learning and preemption, the present invention may include a learning module and a preemption module, which modules may be placed at any of a plurality of points within the radio play system discussed hereinabove. For example, the modules may be placed at the traffic log, at the master log, at the merge, or at the automation. However, because the goal of the use of the modules is to replace unsold or underpaid advertising spots with more lucrative advertising spots, the operation of a rule set from within the modules must be available at the point of placement of the modules. Consequently, although the modules may be placed within the traffic log or master log, advertising payment rate data is not typically available at either location, and cannot be used to operate at either location without being affected by the merge. Further, placement of the modules at the merge might allow the rules of the merge to replace certain unsold or otherwise empty play spots with songs, or other information, thus eliminating the ability of the modules to replace the unsold or otherwise empty spots with more lucrative advertising. Consequently, it may be highly useful to place the modules within or in association with the automation, in order to allow the automation to follow a series of metadata rules on the replacement and reevaluation of a merged traffic log.

Modules placed within the automation may allow for a remote viewing of the real time automated play, in order to allow for real time reevaluation of the current play, and a comparison of the evaluation of the current play with a locally or remotely located rate and rate time chart, for modification, or replacement, via preemption, of information in the real time play list. Such preemptions may be based on cost rules or other rules applied through the ad-in module or modules to the automation.

However, since estimated times for plays as assessed at the merge may vary in accordance with the delays inherent in a radio play, the modules cannot use time estimates, or play identification estimates to assess proper preemption locations. Therefore, the modules may preferably have available a secondary feed showing real time output data of the plays occurring on a radio location then being monitored by the modules. As such, the modules may estimate a proper play location for preemption, and may then monitor to ensure that the preemption location receives preemption at the proper point. This secondary feed showing real time plays may be received from a variety of locations. For example, the play output log may be monitored in real time to assess the plays then occurring. However, even the output log may be subject to certain delays or flaws, and as such may not give a true illustration of real time plays. Alternatively, the modules may view, from within the automation itself, real time play inventory requests as they occur. For example, the automation may call a particular play from a given location at a given time and that location and time may be viewed by the modules and compared with the play list in order to assess, precisely and in real time, the comparison of the play list with the play then occurring, and any preemptions may be modified according to any delays or improprieties assessed.

In an additional embodiment, because the merge may eliminate much of any available unsold or empty play slots, it may be preferable to insert the modules at the merge, rather than waiting for the automation to occur. However, in such an embodiment, the merge would still require availability of, among other things, rate listings and the rates of currently assigned plays. Further, because play does not occur from the merge but rather occurs from the automation, a built-in delay would need to be assessed from the automation back to the merge, in order to allow a real time monitoring of inventory requests at the automation to be applied to the modules performing preemption back at the merge. Further, the modules, whether at the merge or at the automation, may be subject to any number of local or remote rules. The availability of such rules at the merge may allow for the variation of preemption rates at the merge, thereby allowing the merge to vary the amount of unsold or empty slots filled by the merge, such as by dependence on the time or day. For example, it may be more cost effective to a given station to fill more unsold or empty slots during rush hour than during the remainder of the day, because rush hour may bring higher premium rates from advertisers. As such, the amount of unsold or empty slots desired to be filled during rush hour at the merge may be higher from the radio station viewpoint, or may be lower from an advertiser's viewpoint, based on the controller of the modules performing preemption at the merge.

Figure 7:
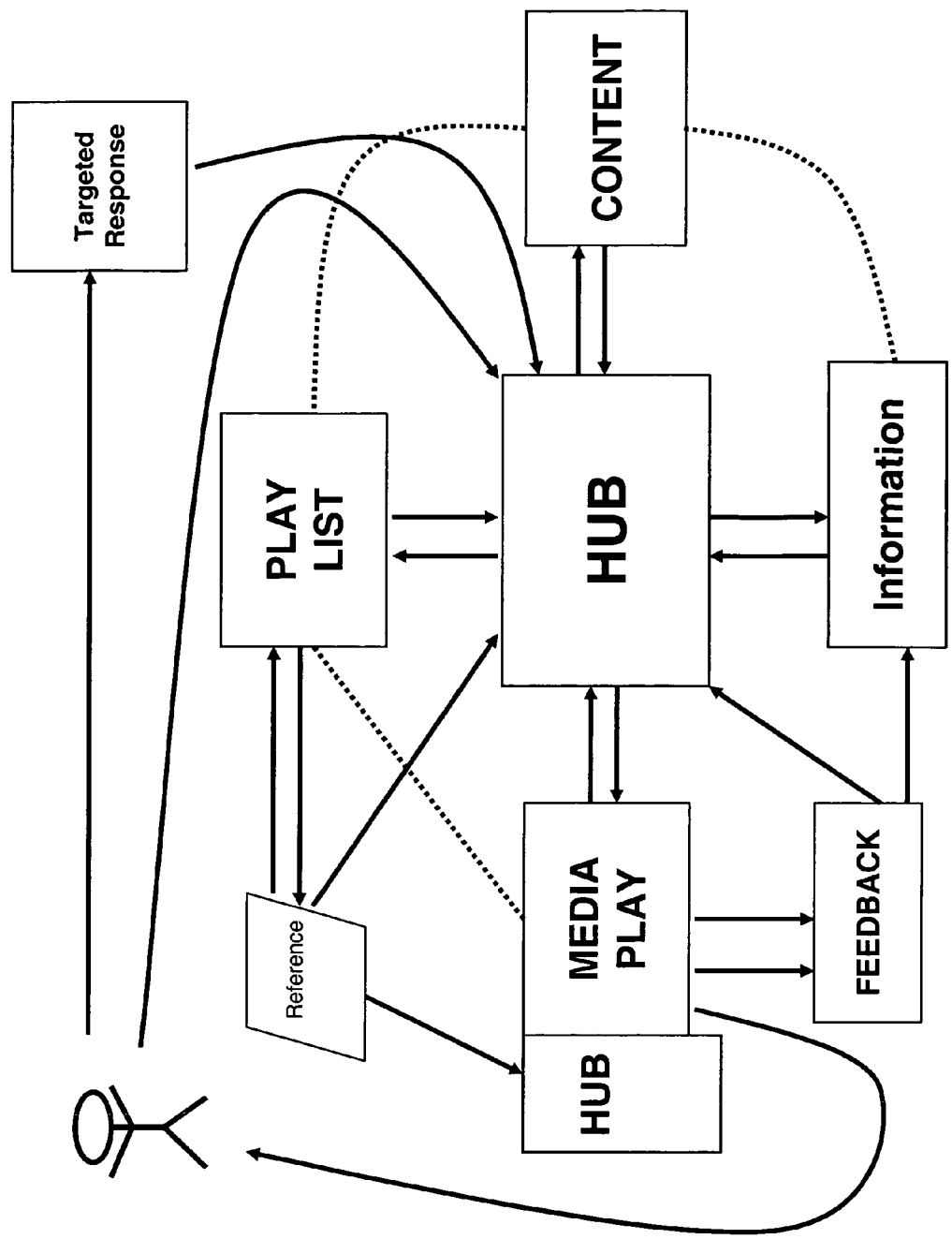
FIG. 7 is an illustration of a radio play environment.

FIG. 7 illustrates an additional embodiment of media play capabilities, wherein the media played is varied based on the actions of one or more receivers of media that was played immediately proceeding. As used herein, the terms radio content and broadcast or broadcast content include any type of media that may be presented via audio, visual, or computerized output to one or more receivers of the output, and that is presently programmed or preprogrammed for media play. As used herein, the terms nonradio content, or nonbroadcast or broadcast nonspecific content, include any media that may be presented via audio, visual, or computerized output to one or more receivers of the content, and that is not presently programmed or preprogrammed for media play.

As illustrated in FIG. 7, a hub may also have accessible thereto a variety of content, including nonradio and radio content. Such content may be local to the hub, or may be available to the hub from any of a variety of sources, including but not limited to intranet, internet, satellite channel, FTP or zipped files that may be accessed by the hub in accordance with one or more commands associated with the hub directing media play. The hub may have multiple portions, more specifically the hub may be any number of modules resident at any number of locations, so long as all such locations are accessible by at least one module resident at the location from which the media play is to occur.

Further, the hub may have accessible thereto a plurality of secondary information, certain of which information may be available in real time, indicative of the success or failure, in accordance with predetermined criteria, of a media play. As such, subsequent media plays may be varied in accordance with the success or failure of proceeding radio plays.

In a specific exemplary embodiment, the hub has accessible thereto a play list for at least one radio studio in at least one marketing region. Multiple radio stations may be available to a single hub, and a marketing region may be any geographic region including but not limited to a city, a county, or state, for example. In this embodiment, the hub may, in part, direct the play list of the one or more radio stations, such as by preempting that which was to be played by the radio station in accordance with the play list with an intelligent insertion that is more likely to bring success in accordance with the predetermined criteria then would preempted play on the play list.

In this example, the play list of a radio station may generally include advertising plays and music plays. As will be apparent to those skilled in the art, listenership generally decreases when ads begin to play and increases during a continuous music play on a radio station. There are exceptions, of course, such as wherein listenership falls for a radio station during play of an unpopular song, for example. Further, listenership even during advertising may not fall if the advertising is popular, such as wherein the advertisement is amusing or of significant interest to listeners. Likewise, listeners to a radio station may respond to certain advertising by undertaking the activity advised by the advertisement, such as by stopping for food at a food establishment or shopping at a particular retail establishment.

In light of all this information, and additional available information, such as real time audio monitoring of what radio station listeners are listening to, such as audio monitoring of vehicles at a heavy intersection, as is known to those skilled in the art, the hub may modify the radio station play list in real time according to certain predetermined criteria. For example, if listenership of the particular radio station begins to fall, the hub may decide to preempt certain advertising that was to play with popular music. Consequently, listenership for that radio station will rise. When listenership reaches a particular level, premium advertising rates may become available for advertisers, due to the vastness of the audience, and the hub may at that stage preempt the music play with premium advertising in order to maximize advertising revenues. Thus, when demand for advertising spots and advertising rates are high, a radio station may create more advertising spots to thusly increase advertising revenues. Further, advertisers willing to pay only lower rates will be able to place ads during times when the advertising can best be afforded by that advertiser.

By way of non-limiting example only, an advertiser may desire to have their advertisement run only when listenership is above 100,000, regardless of the time of day. Using certain predetermined criteria, the hub may modify the radio station play list in real time to intelligently preempt music play, for example, once the 100,000 listener threshold set by the advertiser has been met or exceeded. Once the advertisement has run, the hub may return to music play or continue with running advertisements.

It will be apparent in light of the description hereinabove that various sources may be mined in order to access any desirable variation in the play list. For example, popular music downloads, as assessed by certain internet sites, may give excellent guidance on what would be the most popular radio music plays at a given time. Obviously, playing not simply music but the most popular music at a given time will have the greatest return in increasing listenership to the radio station at that given time. Further, such an embodiment of intelligent preemption and insertion can make available to the hub even more refined decisions. For example, greater advertising rates can be charged for advertising that plays immediately adjacent to the most popular songs available for play by the radio station. The hub may also limit certain content to control the price of advertising by, for example, playing only a limited amount of the most popular music in a given time period. By way of further example, advertising rates may be set according to actual listenership either measured in real time or estimated based on broadcast content.

Per the present invention, intelligent insertion may be performed in any media play context, including any radio source. For example, insertion may be made in a cellular telephone context, an SMS context, a WiMax context, a radio station context, an iPod context, or the like. The media play insertion may include a song, a message, a news, traffic, sports, or weather update, one or more coupons, or an instant message, for example.

Figure 8:
FIG. 8 is an illustration of a buying interface.

FIG. 8 illustrates a buying interface whereby purchasers may purchase and develop advertising, and wherein purchasers may use templates created in accordance with feedback information to develop advertising, and wherein advertisers may access inventories and bid for advertising spots in accordance with desired and entered criteria. For example, advertising inventory or advertising slotting may be made available in accordance with searched for terminologies.

Figure 9:
FIG. 9 is an illustration of a searchable interface.

FIG. 9 illustrates a searchable interface that may be associated with the pre-play knowledge and/or the post-play knowledge of a media play. For example, a media play comprising audio media may, based on the understanding of the hub, be subject to pre-play knowledge that the audio play is about to occur. Further, in an embodiment, the audio play may be speech to text converted prior to the audio play, and as such the audio may be available via a text search based on the pre-play knowledge. Similarly, an audio media play may occur, and post play knowledge may exist that the audio play occurred. The audio may be speech to text converted, and as such may be available via a text search substantially immediately following the occurrence of the audio media play.

Likewise, key descriptors related to but not present in the audio may be electronically associated with a post play recording of the audio itself, a pre-play recording of the audio itself, or the searchable text conversion of the audio play as discussed hereinabove. Thus, the entirety of this information may be stored in a database, such a relational database, wherein key terms, text, circumstances, and pre-play and post-play knowledge of a media play are associated to the media play.

For example, if the Jim and Dean Radio Show interviews the president at 9:00 a.m. on a Tuesday morning, knowledge of the occurrence of a media play comprising the audio of a radio interview between Jim and Dean and the president may allow for an association of key terms, such as "Jim and Dean Show", the "President", "Tuesday", and the like, may be associated with the audio file of the interview, or with the searchable text generated in accordance with the audio file of the interview. As such, the interface of FIG. 9 allows for the location of the audio file based on a search for terms used during the interview, and/or based on a search for the key terms associated with the interview. It will be apparent to those skilled in the art that, although the present exemplary embodiment as discussed with respect to audio media, video media and computer media may be similarly made available for searching.

With regard to the interfaces of FIGS. 8 and 9, the use of searching through the interface of FIG. 9 may be tracked in order to inform relevant characteristics of the advertising made available through the interface of FIG. 8. For example, a high volume of searches at the interface of FIG. 9 for the terms "Jim and Dean Show" and "president" would make advertising that is made available each time such a search is entered command a higher premium for the purchase of such advertising each time such a search is entered. Consequently, an advertiser purchasing and creating advertising in accordance with FIG. 8 may desire to generate a particular media play of the media play advertising entered by that advertiser to the interface of FIG. 8 each time a search is run for Jim and Dean Show and the president, and as such that advertiser may be willing to pay a higher premium rate for the placement of such advertising.

Similarly, via the interface of FIG. 8, certain particularly high volume search terms may be universally purchased by advertisers through the interface of FIG. 8. For example, the Walt Disney Company might desire that, through the interface of FIG. 8, a media play advertisement for the Walt Disney Company be generated each time a search is made through the interface of FIG. 9 for any search involving the term "Disney".

For example, key words and descriptions could be included as headers to computerized files associated with the media play. As such, media play could be tokenized, or broken, into numerous parts, and headers for each division could be devised as to a proper description of the media play in that particular portion of the overall media play. Thereby, a media play could be searchable, and consequently associated advertising media plays could be sale-able, in accordance with the media play, searchable text associated with the media play, divisions of the media play, searchable text associated with divisions of the media play, headers associated with the media play, or headers of sections associated with the divisions of the media play.

Further, the searchability and sale-ability of media plays and portions thereof may be advantageously optimized in accordance with the association of the hub with the media plays. This is due to the fact that the hub allows for pre-play and post-play knowledge of each media play, including scheduling information, pre-emption information, linking information, or insertion information. The searchability and sale-ability of particular media plays may further be associated with the system described in FIGS. 8 and 9 in an inverse relationship. For example, if a user entered a particular media play for review on line, certain relevant key words or associations made with that media play in a searchable engine, such as that of FIG. 9, may be associated with that user's accessing of the media play, and as such advertising media plays may be presented to that user in accordance with search terms deemed most likely associated with that user based on the accessing of that particular media play.

Obviously, the use of the present invention in audio media play embodiments is optimized through the use of an optimized speech to text converter. It will be apparent to those skilled in the art that, in the event an optimized speech to text converter is not available, it may be desirable to manually review speech to text conversions prior to making such conversions available through the interface of FIG. 9.

As discussed hereinabove, it is preferable that the media play interfaces of FIGS. 8 and 9 be associated with the hub discussed hereinthroughout. In an embodiment, media play point output, such as a radio station output, may, upon occurrence of a particular media play or for all media play, be output through a speech to text conversion, voice recognition software system. The hub, through its post play monitoring function, may be associated with, or may include, the voice recognition software and may further include, or be associated with, a data recorder to record the associated text data. Further, that recorder or a second recorder may record the actual audio that has been played, and may capture that audio in high fidelity to allow for premium sound upon play back.

Of course, it will be apparent to those skilled in the art in light of the discussion of the hub hereinabove, that in particular embodiments, such as radio station embodiments, pre-playing knowledge allows that only certain aspects of media play need be recorded. For example, music files that are digitally available and are output through the radio station in accordance with the play list need not be recorded upon occurrence of the play, as such recording is inherently already available digitally. Consequently, only the fact that that particular song was played and on what station and in what region and at what time, need be made available through the search engine, because the song could be simplistically accessed without making an additional recording upon the radio station play. Consequently, in certain exemplary embodiments only the audio feed output from the media play point that is not pre-recorded or pre-play available need be run through a speech to text conversion, or through a header addendum system as is discussed hereinabove. For example, one such feed no pre-play available would be the discussion engaged in by the disc jockey with radio guests or between songs.

In an additional exemplary embodiment, indexing of the media play data for searchability and sale-ability may be performed externally. For example, the hub may make necessary recordings, and may forward the times or circumstances of media plays and the media plays that occurred along with the relevant audio recordings made to a third party, which third party may then associate header files or text conversions with the received information. For example, the third party might associate metadata with each play signifying geographic areas, station names, names of disc jockeys, relevant key search terms, or other relevant data gained automatically, such as over the internet, with the received media play file. Of course, in the example above, the same functions of generating a header and/or metadata may not be handled by a third party, but may be handled at the radio station, at the media play point, or at the hub.

There are numerous applications for the present invention as discussed immediately hereinabove. For example, based on the pre-play tracking of all media plays at the hub, certain non-playable content may be stripped prior to playing at the media play point, but the same content may be made available via searching, or may be restricted from availability via searching. Further, the present invention need not be limited to radio stations. For example, independent parties may place certain media plays for availability, such as on the World Wide Web. Such media plays, if made available to the hub and if requested by a third party, would be indexed and made searchable as discussed with regard to the exemplary embodiments hereinabove. For example, certain independent singers might wish to enter a contest wherein singing recordings are made available to the hub as entrants to the contest. The hub may then associate relevant key words, headers, Metadata, the audio of the media play, the text of the media play, or portions thereof with the media play submitted for the contest. Thereby, each independent media play submitted for the contest might be made available to the search interface of FIG. 9, and thus users of the World Wide Web wishing to access those media plays, or prioritize those media plays, might be able to do so. Such media plays, and the accessing, searching, and consequent interest therein, may further be tracked in accordance with the interfaces of FIGS. 8 and 9, and such tracking for searches for particular media plays might allow for a prioritization of such media plays, with the highest priority of those media plays being deemed the winner of the contest. Advertisers might wish to enter advertising relevant to the particular contest, but might wish to key particular advertising to particular participants of the contest, and could do so in accordance with the interfaces of FIGS. 8 and 9.

Additionally, external information may be used in conjunction with certain information garnered from tracking of searches, to result in particular media plays, such as advertising media plays. These functions could be performed in association with the interfaces of FIGS. 8 and 9. For example, an advertiser may wish to associate an advertising media play with certain particular events, such as sporting events, in FIG. 8. An advertiser could make that advertising available only in a predetermined time frame after a particular sporting event, subject to an assessment that certain interest was present in such sporting event, based on search results or other predictors, such as radio listenership levels, and the advertiser could further delineate what type of ad is to be played based on the weather as assessed from a third party internet site. Alternatively, such advertising could be presented only when certain searches are entered in FIG. 9, subject to the conditions that the sporting event of interest ended within the most recent two hour period, and subject to the requirement that the weather must be rainy.

Figure 10:
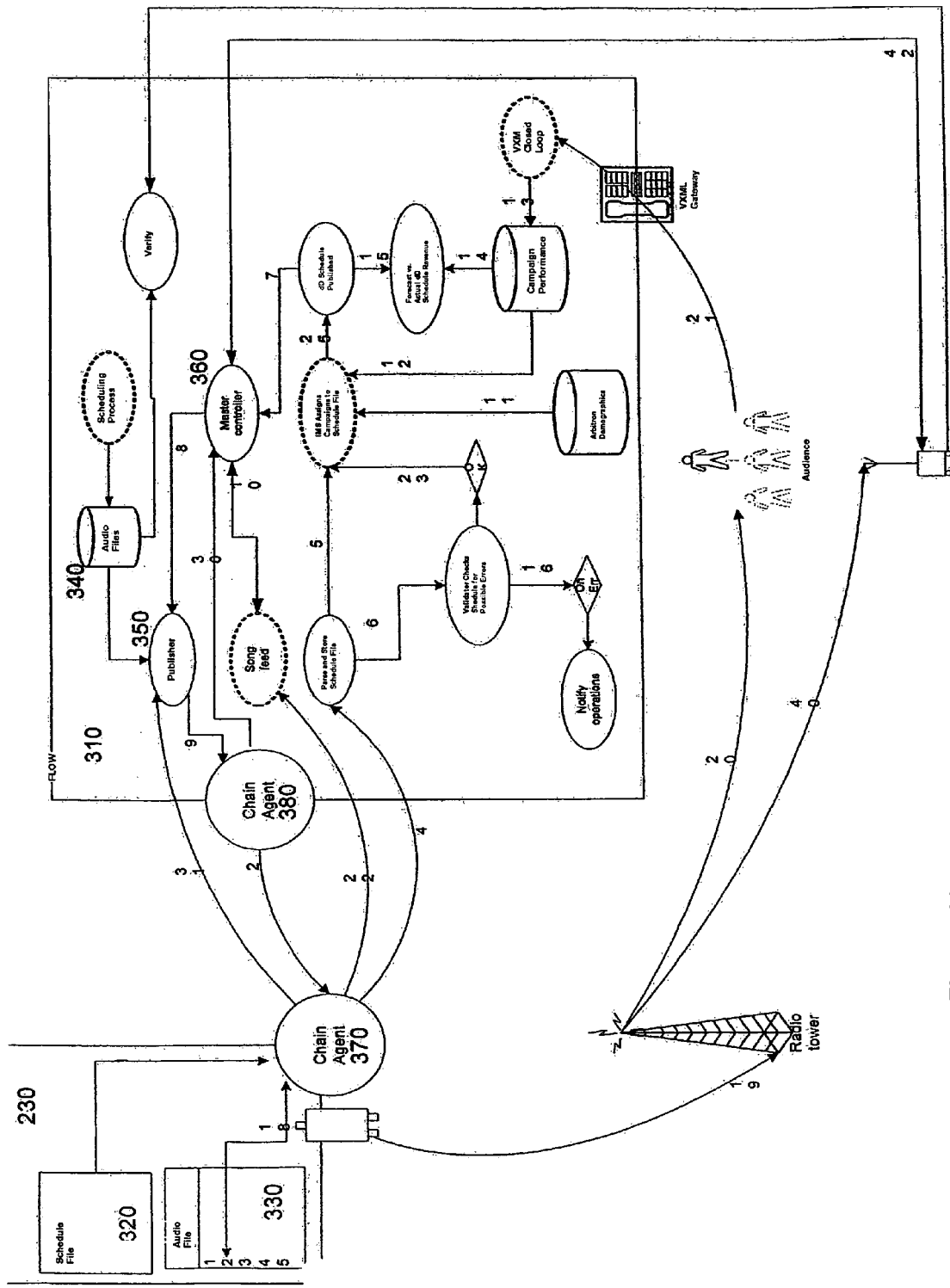
FIG. 10 illustrates a schematic diagram of the flow of information within the communication system of FIGS. 1 and 2.

Referring now to FIG. 10, there is shown a schematic diagram of the flow of information within the communication system of FIGS. 1 and 2. FIG. 10 shows information flow 300. Information flow 300 includes two principle regions, RAS 230 and flow 310. RAS 230 may include schedule file 320 and audio file 330. Flow 310 may include audio advertisement files 340, publisher 350, and master controller 360. The flow of information will be described with reference to the numerals labeling the arrows representing the flow of information.

RAS 230 may include a flow of information for a new schedule file 1. New schedule file may originate with schedule file 320 and be transmitted to a first chain agent 370. This transmission may occur by an external software that publishes a new schedule file to the RAS 230 file system. A first chain agent 370, via a directory watcher process, detects new schedule file 320, and reads it off of disk. This new schedule file 320 may originate or be taken from several systems within the radio station and or from a location outside the studio itself (in the case of remote network programming). Eventually, schedule file 320 may be created while remaining unpublished to RAD 230. The filling algorithm may be local, and the rules for filing the inventory may not be dynamic nor take into consideration a revenue maximization function. For example, 3rd party groups today will "buy" unsold inventory in advance and give the station 1-N ads, that the station can "fill" unsold inventory. The station in this case is selling unsolds in advance without a guaranteed schedule.

First chain agent 370 residing in RAS 230 may pass information to a flow 310. This retrieval of a new schedule file 320 may be seen in FIG. 10 as link 4. This information may be passed to a parse and store step located within flow 310. As the RAS chain agent 370 reads schedule file 320, the file may be transmitted to flow 310. The dD preemptable ad avails (dD Avails) may be parsed from schedule file 320 and stored for further processing. The original schedule file 320 may be stored for billing, accounting, and auditing purposes. This parsing and storing, shown and described to occur within flow 310, may be achieved at studio 140.

After parsing and storing the schedule file, the information is transmitted to the IMS where the campaign is assigned to schedule file 320. This transmission is shown by label 5 and may occur within flow 310. This represents the delivery of the dD Avails to IMS. Rather than collecting the unsold inventory report in a central location, the central location, which tracks ad effectiveness, may publish results to each station and the local station software may use this information to make "intelligent" insertion over unsold inventory. The available ads may need to be published or delivered to station 140 and station 140 may need to receive performance data on those campaigns, so that the local engine may make decisions.

Similarly, after parsing and storing the schedule file, a validator checks for possible scheduling errors. The transmission of information to the validator is shown by label 6. The validator may input this information and analyze schedule file 320 for errors in tag structure, frequency of tags, station contractual obligations, such as minimum number of spots per period, and other errors known to those possessing an ordinary skill in the pertinent arts. This validation, while shown to occur within flow 310, may occur local to hub 150. The validator may output information to IMS on whether the schedule file 320 is validated. This validity feedback is shown by label 23. Once IMS receives an appropriate response from the validator, IMS may process the new dD Avails, by assigning dD advertisements and specific creatives to specific dB Avails. This IMS, while shown to occur within flow 310, may occur local to hub 150.

After the IMS assigns campaigns to the schedule file, the processing may be complete, and the information in the schedule transmitted to a publisher as shown by label 25. The result of the processing of dB avails is a dB Schedule, which is specific to each station. This creation, while shown to occur within flow 310, may occur local to hub 150.

After publishing the schedule, information may be transmitted to the master controller as shown by label 7. The master controller may operate as the brains behind "trafficking" the unsold spots slated for preemption within the dB schedule file. The master controller receives the song feed, including ads, as to what is being played currently on a station. The master controller uses this feed to determine where in the current schedule file a station is. The master controller manages the replacement of the ads, and the swapping back of the original ad, once the spot has run. The master controller, while shown to occur within flow 310, may occur local to hub 150.

A feedback system may be created for creating new schedules as shown by labels 8, 9, and 2. This transmission path may transfer information from the master controller to the publisher, label 8, from the publisher to the second chain agent 380, label 9, and from the second chain agent 380 to the first chain agent 370. Thus, there is a schedule for a given station, master controller instruction to pre-empt a spot, and master controller instructions to restore the preempted spot after it has played. The master controller interrogates the dB Schedule file for a given station, identifying the names of all of the creatives that are scheduled to run, and publishes these creatives to the station via the 8-9-2 pathway. The chain agent examines a cache of previously stored ads to determine that it has stored all creatives. The master controller, if it determines that a spot is ready to be pre-empted, may send a notification via the 8-9-2 pathway, to instruct the chain agent to swap creative one for creative two. The chain agent may confirm receipt of this message via the 2-30 pathway.

The chain agent may manage the physical preemption process. Instructions to preempt an ad may be delivered via path 18 to audio files 330. The chain agent may preserve the original audio file X by either renaming it or moving it to a different directory on the file system. The original file, the dD spot and the slated pre-emption may be copied into a directory of the same file name. The header information within the file, used to populate the RAS screen, may be different and reflects the actual ad that will run even though the file name is the same. The header information may identify what is written to the RAS log files for billing purposes and the station may be aware that the preemption occurred. Once this preemption has been completed or failed due to some error, status may be published via pathway (2-30). The chain agent, which may be responsible for sending the song feed, known as the log, of what is actually playing on the station, such as by pathway labeled 22, may monitor the feed to see the pre-empted spot run. Once it has run, the chain agent may swap the original ad back and notifies the master controller.

The feedback pathway labeled 2, 31 may enable the chain agent to determine if the audio file is available. The chain agent may request the publisher, via pathway 30, to send it a specific creative. The publisher responds by sending the file along with a checksum to confirm the file was not corrupted in transmission via pathway 9, 2.

The chain agent 370 may also prompt the song feed across pathway 22. The chain agent, depending on the RAS configuration, may either watch the log file on the RAS to determine what is being played over the air, or may receive a data feed from the RAS directly containing play history. The chain agent may scrub the feed and publish it to FLOW. The song feed may be exported directly over the WAN to FLOW and a local agent may not be required.

In the event that the validator determines there to be an error, information may be transmitted across pathway 16 in order for notification of an error to occur. If errors are found in the schedule file, such as a result of a contractual breach or a technical issue, a set of rules may be setup dependent upon the type or error and the station the error occurred on, to notify both systems and people that are tasked to resolve the errors.

The event ad may be played. As shown in pathways 19, 20, 21 the information derived hereinabove may be transmitted to the gateway. The information may be transmitted to a radio tower across pathway 19. Radio tower broadcasts to an audience across channel 20. As the audience responds to the pre-empted ad, by calling a telephone number, FLOW traps the caller ID or is notified from the call center, in substantially real time, or on a daily basis, for example.

New calls may be logged, and the information may be provided to IMS across paths 13, 12. As calls are logged, the calls may be tracked against the dB schedule file. Revenues and performance metrics may be tracked given audience size, Arbitron data, and other factors. This information may be used by IMS to optimize ad targeting.

Campaign performance, in addition to being transmitted to IMS, may be transmitted across pathway 14 to a forecaster. Forecaster may compare actual performance with predicted performance and revenues. The IMS algorithms may be evaluated based upon the accuracy of the predications. Over time, the forecaster may project future revenues based on inventory flow and ad campaigns scheduled in the system. The forecaster may provide automated notification to station traffic managers that the present invention may result in income.

A verification may occur. The pathway labeled 40, 42 may demonstrate the availability of verification. The master control, in addition, may instruct the local chain agent at the station to pre-empt a spot and, responsive to the notification, may notify a digital radio that can receive the broadcast of the station to record the ad scheduled by the master controller, such as by sending a schedule or a real time notification to start/stop recording. The audio may be streamed over the WAN and recorded within the FLOW environment. Verification may occur across transmission path 41 demonstrating an ad spot recorded off the air. Once the file is recorded, it may be transmitted to FLOW to verify. The verify process may compare the audio file recorded to the audio file that was shipped to the station. If there is a match, then the ad spot may be logged as verified. If no match exists, the file may be routed to a human capable of listening to the original and the recorded file to determine if the spot matches. If no match still exists, further action may be taken. Subscriber 130 may option to listen to the recorded spots and the original in one of several verification reports. This audio may be streamed over the WAN and recorded within the FLOW environment.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A system for developing at least one media play in a broadcast medium broadcast to a plurality of receivers, comprising:
a displayer that displays a plurality of templates that enable a user to select at least two desired criteria limiting circumstances for media play, said criteria evaluated based on feedback from a plurality of members of an audience regarding prior occurrences of the at least one media plays; and
an accessor that develops at least one media play by accessing a media play inventory and preempting certain of the media play inventory with an insertion of the at least one media play according to said at least two desired criteria, the insertion of the at least one media play being broadcast to the plurality of receivers in a real time broadcast, wherein the preempting comprises evaluating said at least two desired criteria using information determined by monitoring the real time broadcast, and wherein one of the at least two desired criteria limiting circumstances is a number representative of the real time broadcast's current audience size.

2. The system of claim 1, wherein the at least two desired criteria limiting circumstances comprise at least one of environmental conditions, searched-for terms, prior media plays, and subsequently scheduled media plays.

3. The system of claim 1, wherein each of said templates is selectable in accordance with at least one desired result of the media play.

4. The system of claim 1, wherein the media play inventory comprises a radio station play list.

5. The system of claim 1, wherein the media play comprises advertising.

6. A computer-implemented method for developing at least one media play in a broadcast medium broadcast to a plurality of receivers, the method comprising:
providing a plurality of templates enabling a user to select at least two desired criteria limiting circumstances for media play, said criteria evaluated based on feedback from a plurality of members of an audience regarding prior occurrences of the at least one media play;
developing at least one media play by accessing a media play inventory for preempting certain of the media play inventory with an insertion of the media play according to said at least two desired criteria, the insertion of the at least one media play being broadcast to the plurality of receivers in a real time broadcast, wherein the preempting comprises evaluating said at least two desired criteria using information determined by monitoring the real time broadcast, and wherein one of the at least two desired criteria limiting circumstances is a number representative of the real time broadcast's current audience size.

7. The method of claim 6, wherein the at least two desired criteria limiting circumstances comprise at least one of environmental conditions, searched-for terms, prior media plays, and subsequently scheduled media plays.

8. The method of claim 6, wherein each of said templates is selectable in accordance with at least one desired result of the media play.

9. The method of claim 6, wherein the media play inventory comprises a radio station play list.

10. The method of claim 6, wherein the media play comprises advertising.

11. A computer-implemented method comprising:
receiving a plurality of criteria associated with a media play;
monitoring a real time broadcast;
evaluating one or more of the criteria against a result of the monitoring, wherein at least one of the criteria is a number representative of the real time broadcast's current audience size; and
selectively generating information based on a result of the evaluating to cause a preemption of the real time broadcast with the media play.

12. The method of claim 11, further comprising:
directing a play list of one or more radio stations, the directing comprising sending the generated information to the one or more radio stations.

13. The method of claim 11, wherein the generated information comprises one or more instructions to preempt a scheduled advertisement with a replacement advertisement.

14. The method of claim 11, wherein information triggering the preemption of the real time broadcast is generated if the result of the monitoring matches the evaluated criteria.

* * * * *

UNITED STATES PATENT AND TRADEMARK OFFICE
CERTIFICATE OF CORRECTION

| | | |
|---|---|---|
| PATENT NO. | : 8,495,089 B2 | Page 1 of 1 |
| APPLICATION NO. | : 11/141537 | |
| DATED | : July 23, 2013 | |
| INVENTOR(S) | : Steelberg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this
Tenth Day of February, 2015

Michelle K. Lee
*Deputy Director of the United States Patent and Trademark Office*